US011808459B2

(12) United States Patent  
Brudieu et al.

(10) Patent No.: US 11,808,459 B2  
(45) Date of Patent: Nov. 7, 2023

(54) GLASS-CERAMIC PLATE COMPRISING A LIQUID-RETAINING BEAD

(71) Applicant: EUROKERA S.N.C., Chateau Thierry (FR)

(72) Inventors: Barbara Brudieu, Paris (FR); Thibault Guedon, Paris (FR)

(73) Assignee: EUROKERA S.N.C., Château Thierry (FR)

( * ) Notice: Subject to any disclaimer, the term of this patent is extended or adjusted under 35 U.S.C. 154(b) by 769 days.

(21) Appl. No.: 16/651,805

(22) PCT Filed: Sep. 28, 2018

(86) PCT No.: PCT/EP2018/076524  
§ 371 (c)(1),  
(2) Date: Mar. 27, 2020

(87) PCT Pub. No.: WO2019/063821  
PCT Pub. Date: Apr. 4, 2019

(65) Prior Publication Data  
US 2020/0248908 A1 Aug. 6, 2020

(30) Foreign Application Priority Data  
Sep. 29, 2017 (FR) .................................... 1759082

(51) Int. Cl.  
*B32B 15/04* (2006.01)  
*B32B 17/06* (2006.01)  
(Continued)

(52) U.S. Cl.  
CPC .............. *F24C 15/10* (2013.01); *C03C 17/30* (2013.01); *F24C 7/083* (2013.01); *H05B 3/74* (2013.01);  
(Continued)

(58) Field of Classification Search  
CPC ............................. F24C 15/00; C03C 2217/76  
(Continued)

(56) References Cited

U.S. PATENT DOCUMENTS 8,596,205 B2 * 12/2013 Driver .................. A47B 96/028  
                                                                           108/108  
9,074,778 B2 * 7/2015 Nall ........................ F24C 15/10  
(Continued)

FOREIGN PATENT DOCUMENTS

EP     1 178 265 A2    2/2002  
FR     2 913 098 A1    8/2008  
(Continued)

OTHER PUBLICATIONS

International Search Report as issued in International Patent Application No. PCT/EP2018/076524, dated Dec. 17, 2018.

*Primary Examiner* — Lauren R Colgan  
(74) *Attorney, Agent, or Firm* — Pillsbury Winthrop Shaw Pittman LLP

(57) ABSTRACT

A glass-ceramic plate for a cooking device includes a first main face to be in contact with liquids, a second main face and an edge, a liquid-retaining bead fastened to and in contact with the first main face, wherein the retaining bead surrounds a region of the first main face so as to form a liquid-retaining reservoir, and includes at least two hydrophobic sub-beads inscribed within one another and separated by hydrophilic zones, a width of the hydrophilic zone between two consecutive sub-beads is throughout at least greater than 500 µm and less than a threshold value, the threshold value being defined so that, when a liquid is present in the hydrophilic zone, a variation in the retention time or volume of the liquid before overflowing, relative to a same liquid present in a hydrophilic zone, the width of which is greater than the value, is less than 5%.

20 Claims, 5 Drawing Sheets

(51) Int. Cl.
*F24C 15/10* (2006.01)
*C03C 17/30* (2006.01)
*F24C 7/08* (2006.01)
*H05B 3/74* (2006.01)

(52) U.S. Cl.
CPC ...... *C03C 2217/76* (2013.01); *C03C 2217/77* (2013.01); *C03C 2218/151* (2013.01)

(58) Field of Classification Search
USPC ........................................................ 428/426
See application file for complete search history.

(56) References Cited

U.S. PATENT DOCUMENTS

| | | | | |
|---|---|---|---|---|
| 2006/0182929 | A1* | 8/2006 | Joerdens | F24C 15/005 428/141 |
| 2009/0155566 | A1* | 6/2009 | Gentleman | F28F 13/187 428/312.8 |
| 2010/0102693 | A1* | 4/2010 | Driver | F25D 25/024 248/250 |
| 2011/0014432 | A1* | 1/2011 | Terada | B08B 17/06 427/596 |
| 2012/0009396 | A1* | 1/2012 | Sikka | C03C 17/30 427/284 |
| 2012/0216880 | A1* | 8/2012 | Nall | F24C 15/10 137/312 |
| 2014/0154476 | A1* | 6/2014 | Perillon | A47J 36/025 427/256 |
| 2015/0260412 | A1* | 9/2015 | Nall | C03C 17/28 427/269 |
| 2016/0208111 | A1* | 7/2016 | Hurley | B05D 1/005 |
| 2020/0317560 | A1* | 10/2020 | Lepcha | C03C 8/20 |

FOREIGN PATENT DOCUMENTS

| | | | |
|---|---|---|---|
| JP | 2001124347 A | * | 5/2001 |
| WO | WO 2011/056742 A1 | | 5/2011 |

* cited by examiner

GLASS-CERAMIC PLATE COMPRISING A LIQUID-RETAINING BEAD

CROSS-REFERENCE TO RELATED APPLICATIONS

This application is the U.S. National Stage of PCT/EP2018/076524, filed Sep. 28, 2018, which in turn claims priority to French patent application number 1759082 filed Sep. 29, 2017. The content of these applications are incorporated herein by reference in their entireties.

The present invention relates to a glass-ceramic plate for a cooking device comprising a liquid-retaining bead. When the glass-ceramic plate is used in a cooking device, the retaining bead makes it possible to retain the liquids liable to overflow from the cooking utensils or containers on the surface of the plate.

Glass-ceramic plates are today very widely used as cooking surfaces in many cooking devices. They are inorganic materials, usually based on silicates or aluminosilicates. Their main advantages are the flatness of their surface, their low expansion coefficient and their resistance to heat shocks.

During the cooking of food products on a glass-ceramic plate, sometimes food liquids overflow from the kitchen utensils or containers and spread rapidly over the whole of the surface of the plate due to its great flatness. For reasons of user safety and of deterioration of the environment in which the cooking device is used, it is preferable for these unforeseen flows to be retained on the plate before they pour off the surface of the plate.

The food liquids are generally water, aqueous solutions or organic solutions in which water is one component.

Various systems or devices that have the objective of retaining liquids on cooking surfaces are described in the prior art.

Document EP 1178265 A1 describes a cooking device comprising a glass-ceramic plate, directly etched on the surface of which are channels, into which the liquids to be retained flow. However, the etching of such channels is liable to make the glass-ceramic plate locally weaker and to give rise to inopportune fractures during the machining or handling of the products.

Document FR 2913098 A1 proposes an alternative solution that consists in placing a level sensor on the edges of the cooking containers so as to warn of any increase in the liquid level before it overflows. The main drawback is that each container requires a sensor. In the event of forgetting or not activating the sensor, the liquids are not retained.

Document WO 2011/056742 A1 describes a hydrophobic coating positioned on the periphery of a cooking surface or surrounding certain regions of said surface, so as to create retaining reservoirs. These hydrophobic coatings have the advantage of retaining a certain volume of liquid in the reservoirs that they define. In this type of reservoir, the liquid generally takes the form of a film. The volume of the liquid is thus defined by the surface area of the reservoir and by the height of the film formed. Yet, within the context of research carried out on the flow of the liquids in contact with hydrophobic coatings, it was observed that the height attained by the film before the liquid overflows beyond the hydrophobic coating is less than the theoretical capillary height. The result of this is that the volume of liquid retained is less than the desired volume and the retention time is shorter than that expected. The reason for this is the movements inherent to the liquid during the flow thereof which give rise to local variations in the internal pressure. At the interface between the liquid and the hydrophobic material, a local pressure variation may destabilize the film of liquid which then spills out of the reservoir.

Most of the measurements of retention volume which are reported in the prior art for describing the cooking plates provided with reservoirs defined by hydrophobic coatings were carried out according to protocols in which there is no flow of the liquids. These protocols are referred to as "static". The phenomenon described above and which corresponds to most of the real overflow cases is therefore generally neglected. The products comprising such reservoirs then appear to perform less well than what is stated.

The present invention solves these problems. The inventors have been able to demonstrate that an alternation of hydrophobic zones and hydrophilic zones according to a pattern that satisfies certain geometric constraints makes it possible to improve the retention of the moving liquids, in particular to slow down or even suspend the flow thereof. The constituents of the hydrophobic zones, when the parameters characterizing their hydrophobic character satisfy certain criteria, may also increase this retention capacity.

One subject of the present invention is therefore a glass-ceramic plate for a cooking device comprising:
- a first main face liable to be in contact with liquids when the plate is in the process of being used, a second main face and an edge,
- a liquid-retaining bead fastened to and in contact with said first main face.

The glass-ceramic plate is characterized in that said retaining bead:
- surrounds at least one region of said first main face so as to form a liquid-retaining reservoir, and
- comprises at least two hydrophobic sub-beads inscribed within one another and separated by hydrophilic zones, the width of the hydrophilic zone between two consecutive sub-beads is throughout at least greater than 500 μm and less than a threshold value, said threshold value being defined so that, when a liquid is present in the hydrophilic zone, the variation in the retention time or volume of said liquid before overflowing, relative to a same liquid present in a hydrophilic zone, the width of which is greater than said threshold value, is less than 5%.

Preferably the threshold value is at most 2.5 cm. The width of the hydrophilic zone between two consecutive sub-beads is then throughout between 500 μm and 2.5 cm.

The expression "when it is in the process of being used" means that the glass-ceramic plate is used in a cooking device and that kitchen utensils or containers containing liquids are used or handled on or above the surface thereof suitable for being in contact with liquids.

In the remainder of the text, for reasons of clarity and conciseness, the expression "surface of the glass-ceramic plate" or equivalents thereof may be used. This expression denotes the surface of the face of the glass-ceramic plate.

The hydrophobic or hydrophilic character of a material is customarily defined according to the value of the contact angle formed by a static drop of water in contact with the surface of the material. The contact line is the triple interface line between the water, the material and the air. The so-called static contact angle corresponds to the angle formed between the plane tangent to the surface of the drop of water and the plane of the surface of the material located under the drop of water. When the value of the angle is less than 90°, the material is said to be hydrophilic, when it is equal to or greater than 90°, it is said to be hydrophobic.

The contact angle measurements are generally performed with a goniometer. The instrument deposits a drop of water of calibrated volume on a surface. By means of a camera, image analysis software detects the shape of the drop, the location of the substrate, then measures the contact angle. Examples of goniometers are the DSA100 or else Mobile-Drop GH11 goniometers sold by Krüss. An example of a measurement protocol is the protocol described in the standard ASTM D7334-08(2013), Standard Practice for Surface Wettability of Coatings, Substrates and Pigments by Advancing Contact Angle Measurement.

For the present invention, the hydrophobic or hydrophilic character of a material is defined according to the above definition. Thus, the value of the contact angle formed by a drop of water on the hydrophilic zones is less than 90°. The value of the contact angle formed by a drop of water on the hydrophobic sub-beads is equal to or greater than 90°.

In one embodiment, the hydrophilic zones comprise one or more hydrophilic coatings deposited on the surface of the glass-ceramic plate. These hydrophilic coatings have the objective of advantageously increasing the hydrophilic character of the surface of the plate in order to increase the retention capacity.

These hydrophilic coatings may be of organic or inorganic nature. The constituent(s) of the hydrophilic coatings may be chosen from polyvinyls, polyacrylonitriles, polymethyl acrylates, cellulose acetates, or copolymers of vinyl acetates and vinyl chlorides. Examples of inorganic materials are silica, alumina or zirconia.

These coatings may be deposited according to a deposition method chosen from chemical liquid deposition, chemical vapor deposition, vacuum chemical deposition, screen-printing, centrifugal coating, dip coating, jet printing deposition, 3D printing deposition.

In one preferred embodiment, the hydrophilic zones are formed by the surface of the glass-ceramic plate that has not undergone any surface treatment since the silicates and aluminosilicates making up most glass-ceramic plates are naturally hydrophilic materials. This embodiment is faster and simpler to implement.

According to the invention, the retaining bead surrounds at least one region of the face of the glass-ceramic plate onto which liquids are liable to spill during the cooking or preparation of foodstuffs. It then defines a reservoir for retaining or trapping liquid. A liquid which overflows from a container or a cooking utensil and spreads over the region thus defined and forms a film, the flow of which is blocked by the retaining bead.

The cooking utensils or containers are generally positioned on the zones of the face of the glass-ceramic plate under which heating elements are located when the glass-ceramic plate is used in a cooking device. The retaining bead may advantageously surround at least one of these zones.

In one embodiment, the retaining bead is placed at at most 3 cm, in particular at most 2 cm, or even at most 1 cm from the edge of said glass-ceramic plate. Thus placed at the periphery of the plate, a single retaining bead is enough to surround all of the zones of the glass-ceramic plate where the cooking utensils or container are used. This embodiment is particularly advantageous for cooking devices in which the heating or cooking zones are formed by one or more portions of the surface of the glass-ceramic plate. It is also simpler and faster to implement since it requires the deposition of only one bead.

In one alternative embodiment, several retaining beads are fastened to the main face of the glass-ceramic plate liable to be in contact with liquids during the use thereof. Each of these retaining beads may surround different regions of the surface. These regions may be at a distance from or in contact with one another. Certain of these various retaining beads may be separate or joined, i.e. they may or may not have common portions. Preferably, these retaining beads surround regions of the glass-ceramic plate on which cooking utensils or containers liable to contain liquids are used.

The surface area of the region of the glass-ceramic plate surrounded by at least one retaining bead advantageously represents at least 60%, in particular 70%, preferably 80%, or even 90% of the surface area of the face of the glass-ceramic plate.

The width of a retaining bead may advantageously be between 2 cm and 6 cm, in particular between 3 and 6 cm, or even between 3 and 5 cm.

The region(s) defined by the hydrophobic beads may have any geometric shape: rectangular, circular, oval, triangular, trapezoidal, parallelepipedal or else may adopt the shape of an esthetic pattern. The geometric shape is matter of choice depending on the technical constraints imposed by the bead deposition method and the use of the glass-ceramic plate, or else depending on the esthetic taste of the clients or of whoever implements the invention.

According to the invention, the retaining beads comprise at least two hydrophobic sub-beads inscribed within one another and separated by hydrophilic zones. In other words, each hydrophobic sub-bead individually defines a region of the surface of the glass-ceramic plate. The expression "inscribed within one another" applied to the hydrophobic sub-beads then means that each hydrophobic sub-bead consecutive to another hydrophobic sub-bead starting from the edge of the glass-ceramic plate is located in the region of the surface of the plate defined by this other hydrophobic sub-bead.

The consecutive sub-beads must be close enough that the height of the film formed by the liquid in the region defined by the retaining bead is greater than the height which would be obtained using a retaining bead according to the prior art and which would only comprise a single sub-bead.

Two consecutive sub-beads may be irregularly or regularly spaced apart as long as the width of the hydrophilic zone between two consecutive sub-beads is throughout between 500 µm and 2.5 cm, in particular between 500 µm and 1.2 cm, or even between 700 µm and 1.2 cm.

Moreover, the width of the hydrophobic sub-beads may advantageously be between 5 mm and 20 mm, in particular between 7 mm and 18 mm, or even between 10 mm and 15 mm without the retention effect being adversely affected. This characteristic thus makes it possible to reduce the amount of material necessary for forming the hydrophobic sub-beads.

The contact of a drop of liquid with the surface of a material may also be characterized using two other contact angles: the advancing angle $\theta a$ and the receding angle $\theta r$. These two angles are said to be dynamic since they correspond to the contact angles formed by a drop of water in contact with the surface of the material when its line of contact with the material moves under the effect of an increase or a decrease in its volume. The contact line corresponds to the triple line formed at the interface between the water of the drop, the surface of the material and the atmosphere.

More specifically, the advancing angle $\theta a$ is the angle formed between the plane tangent to the surface of the drop of water and the plane of the surface of the material located under the drop of water before the contact line advances under the effect of the increase in the volume of water of the drop.

The receding angle θr is the angle formed between the plane tangent to the surface of the drop of water and the plane of the surface of the material located under the drop of water before the contact line recedes under the effect of a reduction in the volume of water of the drop.

According to the current knowledge available in the prior art, the advancing angle θa may be considered to be a measure of the wetting or repellent character of the surface, and the receding angle θr to be a measure of the adhesion of the drop of water to the surface.

The measurement of the advancing and receding angles is generally carried out using the same instruments as those used for the contact angle measurement.

The volume of liquid retained depends on the surface area of the region defined by the retaining bead and on the height or thickness attained by the film formed. However, the flow of liquid originating from a container or a utensil is generally continuous with a certain flow rate. The time beyond which the liquid spills out of the reservoir therefore depends simultaneously on the surface area of the region defined by the retaining bead, on the flow rate of the flow and on the maximum height that liquid reaches in the reservoir.

In one preferred embodiment, when the hydrophobic sub-beads are in contact with water, the hysteresis H of the contact angle between said hydrophobic sub-beads and the liquid is greater than or equal to 20°, in particular greater than or equal to 25°, or even greater than or equal to 30°, said hysteresis H of the contact angle being defined as the difference between the advancing angle θa and the receding angle θr of the liquid on one said hydrophobic sub-beads, in other words H=θa−θr. It has been observed, quite surprisingly, that when the value of this hysteresis is greater than or equal to 20°, in particular greater than or equal to 25°, or even greater than or equal to 30°, the maximum height of the liquid film, i.e. the volume of liquid retained, increases. The retention of the moving liquid is then favored. The value of the hysteresis is preferably less than or equal to 100.

This surprising effect is particularly significant when the advancing angle, θa, of the liquid on the sub-beads is also between 108 and 120°, in particular between 110° and 120°.

There is a very large variety of hydrophobic compounds or materials that may be suitable for the creation of the hydrophobic sub-beads. Among these materials, a person skilled in the art may in particular choose those for which their other properties, in particular thermal and/or mechanical properties, are compatible with the usage environment or application of the glass-ceramic plate.

For example, when the glass-ceramic plate is used in a cooking device intended for domestic use, a person skilled in the art may choose the hydrophobic material(s) which also withstand contact with hot liquids, the temperatures of which are typically between 50° C. and 150° C., without losing their hydrophobic character. Similarly, it may be advantageous for the hydrophobic materials to withstand heating and cooling thermal cycles without deteriorating or losing their hydrophobic character.

The hydrophobic materials may also advantageously be chosen so that they also have a high mechanical strength, in particular high abrasion resistance. Specifically, when the glass-ceramic plates are used in cooking devices for domestic use, they are subjected to a lot of rubbing linked to the movements of the cooking containers and/or utensils on their surface. If the hydrophobic sub-beads are positioned in the vicinity of the zones of the surface of the glass-ceramic plates where these movements are intense and frequent, they will also have to be resistant to abrasion. On the other hand, if the hydrophobic sub-beads are away from these zones, for example when the retaining bead is placed in the vicinity of the periphery of the glass-ceramic plates, they will be subjected to less rubbing. Therefore, a high abrasion resistance is not always necessary depending on the choices of the positioning of the retaining bead(s).

The hydrophobic materials that may in particular be suitable for the creation of the hydrophobic sub-beads may be organic or inorganic. Advantageously, the hydrophobic sub-beads may comprise one or more organic or inorganic compounds, the surface tension of which is at most 20 $mN·m^{-1}$, in particular at most 15 $mN·m^{-1}$, or even at most 10 $mN·m^{-1}$. Such hydrophobic compounds generally also have a lipophobic or oleophobic character which may be useful when the liquids that overflow from the cooking utensils or containers are enriched in fatty substances.

By way of nonlimiting example, the hydrophobic sub-beads may comprise one or more organic compounds chosen from polysiloxanes, organosiloxanes, fluorosiloxanes, fluorocarbons, fluoropolymers, fluorosilanes and a mixture thereof.

Also by way of nonlimiting example, the hydrophobic sub-beads may comprise one or more inorganic compounds chosen from colloidal silica, nanoparticulate silica, graphenes and a mixture thereof.

The hydrophobic sub-beads may also be composites, i.e. may comprise a mixture of materials overall having a hydrophobic character. For example, they may be based on a mixture of non-hydrophobic materials and hydrophobic particles, said hydrophobic particles giving the mixture a hydrophobic character. These hydrophobic particles may be composed of the abovementioned hydrophobic materials.

Generally, only the surfaces of the sub-beads are mainly in contact with the liquids when these flow onto the glass-ceramic plate. Consequently, it may be sufficient for only these surfaces to have a hydrophobic character. In such a case, the sub-beads may comprise a non-hydrophobic portion on which a hydrophobic coating is deposited in order to give it a hydrophobic character at the surface. For example, the non-hydrophobic portion may be an enamel and the hydrophobic coating may be based on one of the abovementioned hydrophobic materials. Such an embodiment is particularly advantageous since the enamel may favor the adhesion of hydrophobic coating to the surface of the glass-ceramic plate and provide additional mechanical strength.

In this embodiment, the hydrophobic sub-beads comprise a hydrophobic coating. The hydrophobic sub-beads may then be deposited in two steps: a first step in which the enamel may be deposited on the surface of the glass-ceramic plate, then a second step in which the hydrophobic coating is deposited on the enamel.

Besides the nature of the materials which form them, the hydrophobic character of the materials also depends on the morphology of their surface.

In one particular embodiment of the invention, the value of the roughness parameter, Ra, of the hydrophobic sub-beads is between 1 and 10 μm, preferably between 2 and 5 μm. In another embodiment of the invention the value of the peak-to-valley parameter, Rz, of the hydrophobic sub-beads is between 5 and 50 μm, preferably between 10 and 20 μm. These two embodiments may be combined.

The specifications for the measurement of the parameters Ra and Rz are described in the standard ISO 4288:1996, Geometrical Product Specifications (GPS)—Surface texture: Profile method—Terms, definitions and surface texture parameters. The cut-off length (wavelength cut-off) used for the measurement of the parameters Ra and Rz in the present invention is 2.5 mm.

All the embodiments described may be combined.

Another subject of the present invention is a process for manufacturing a glass-ceramic plate as described above. In this manufacturing process, the hydrophobic sub-beads may be deposited according to one or more of the methods chosen from chemical liquid deposition, chemical vapor deposition, vacuum chemical deposition, such as spraying, screen printing, centrifugal coating, dip coating, inkjet printing deposition, wiping, flexography, magnetron sputtering, 3D printing deposition.

The present invention also relates to a cooking device in which a glass-ceramic plate provided with a liquid-retaining bead as described above is used.

The cooking devices also generally comprise control and/or display units that make it possible to regulate and/or display information relating, for example, to the heating power or temperature. These units may be positioned below or above, optionally in contact with, the glass-ceramic plate. The terms "below" and "above" are defined relative to the orientation of the main face liable to be in contact with the liquids: the glass-ceramic plate is oriented so that this face is the upper face of the cooking device on which the cooking containers or utensils are used.

For example, the display units may comprise means for protecting information, placed below the glass-ceramic plate, which project light signals onto the face opposite the main face liable to be in contact with the liquids. The information projected is then visible via transparency through the glass-ceramic plate.

The control units may be touch devices comprising means for detection of placed under the plate of the glass-ceramic plate. These means give certain zones of the plate a touch-pointing function which may be activated by means of touch or pressure of the fingers on the corresponding zones of the main face liable to be in contact with the liquids. The switching on of the cooking device and the regulation of the heating power may then be carried out simply by the movement of the fingers. Alternatively, the control units may be mechanical buttons positioned on the face liable to be in contact with the liquids and that can be activated by rotation.

When a liquid overflows from a cooking container and flows onto the face of the glass-ceramic plate, it is advantageous that it does not reach the control units. If the control units are, for example, mechanical buttons, they will not be deteriorated. If these units are touch devices, the touch pointing function will not be disturbed by the presence of the liquid. The cooking device can then still be switched off safely.

Preferably, the cooking device according to the invention further comprises a control unit which is not within the region(s) of the glass-ceramic plate defined by the retaining bead.

The advantages of the invention are illustrated by the figures and examples described below.

Figure 1:
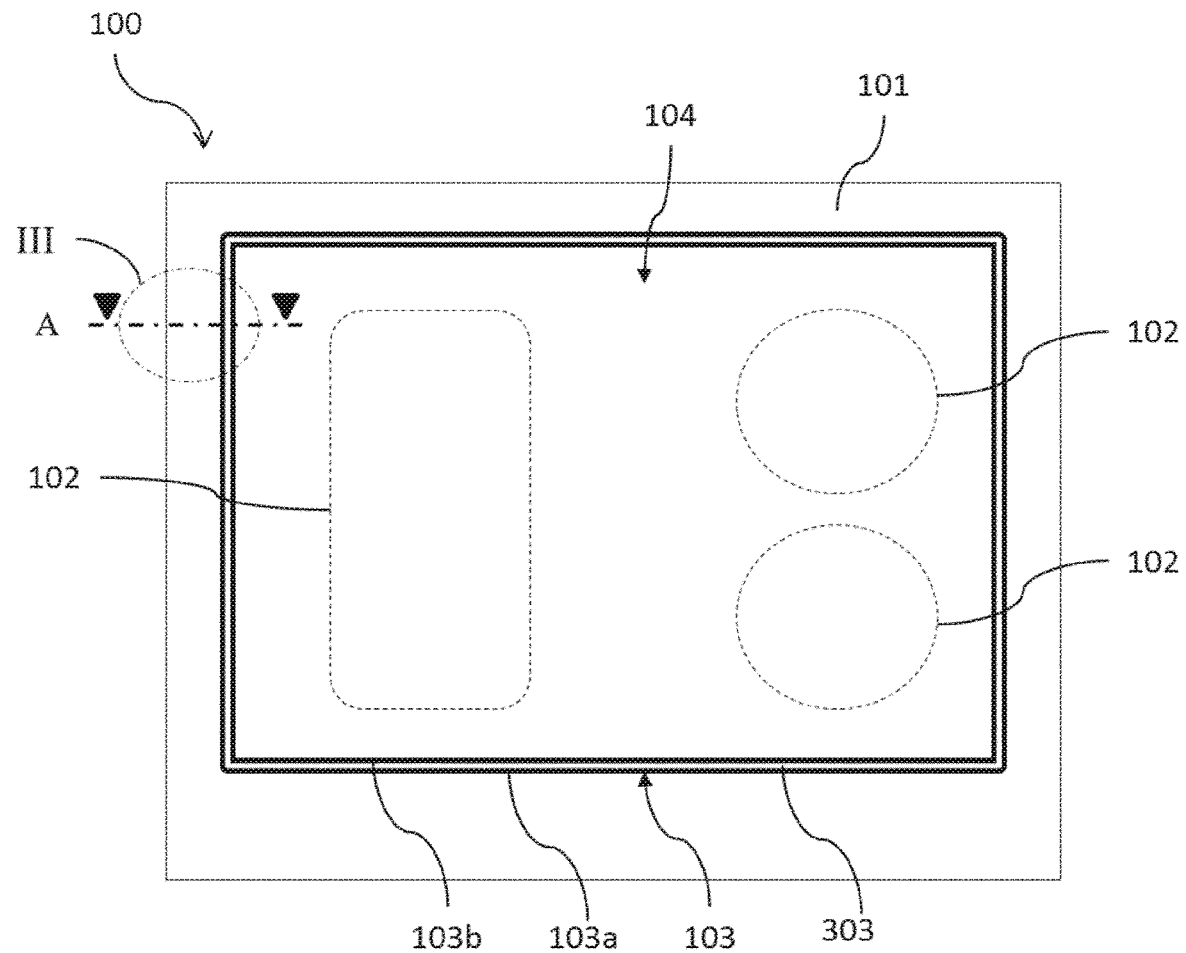
FIG. 1 is a schematic representation of a glass-ceramic plate according to a first embodiment of the invention.

FIG. 1 represents a glass-ceramic plate 100 according to a first embodiment of the invention. It comprises a main face 101 liable to be in contact with the liquids when it is in the process of being used. For purely illustrative purposes, zones 102 of the face of the glass-ceramic plate under which heating elements may be located when the glass-ceramic plate is used in a cooking device are also represented. The glass-ceramic plate comprises a single liquid-retaining bead 103 which surrounds a region 104 of the main face 101 of the plate liable to be in contact with the liquids. The retaining bead 103 is located in the vicinity of the periphery of the glass-ceramic plate and surrounds zones 102 of the face of the glass-ceramic plate under which heating elements may be located when the glass-ceramic plate is used in a cooking device. The liquid-retaining bead comprises two hydrophobic sub-beads 103a-103b separated by a hydrophilic zone 303. The alternation of the hydrophobic sub-beads and of the hydrophilic zone is represented in FIG. 3 which corresponds to a cross section through the detail III along the plane A.

Figure 2:
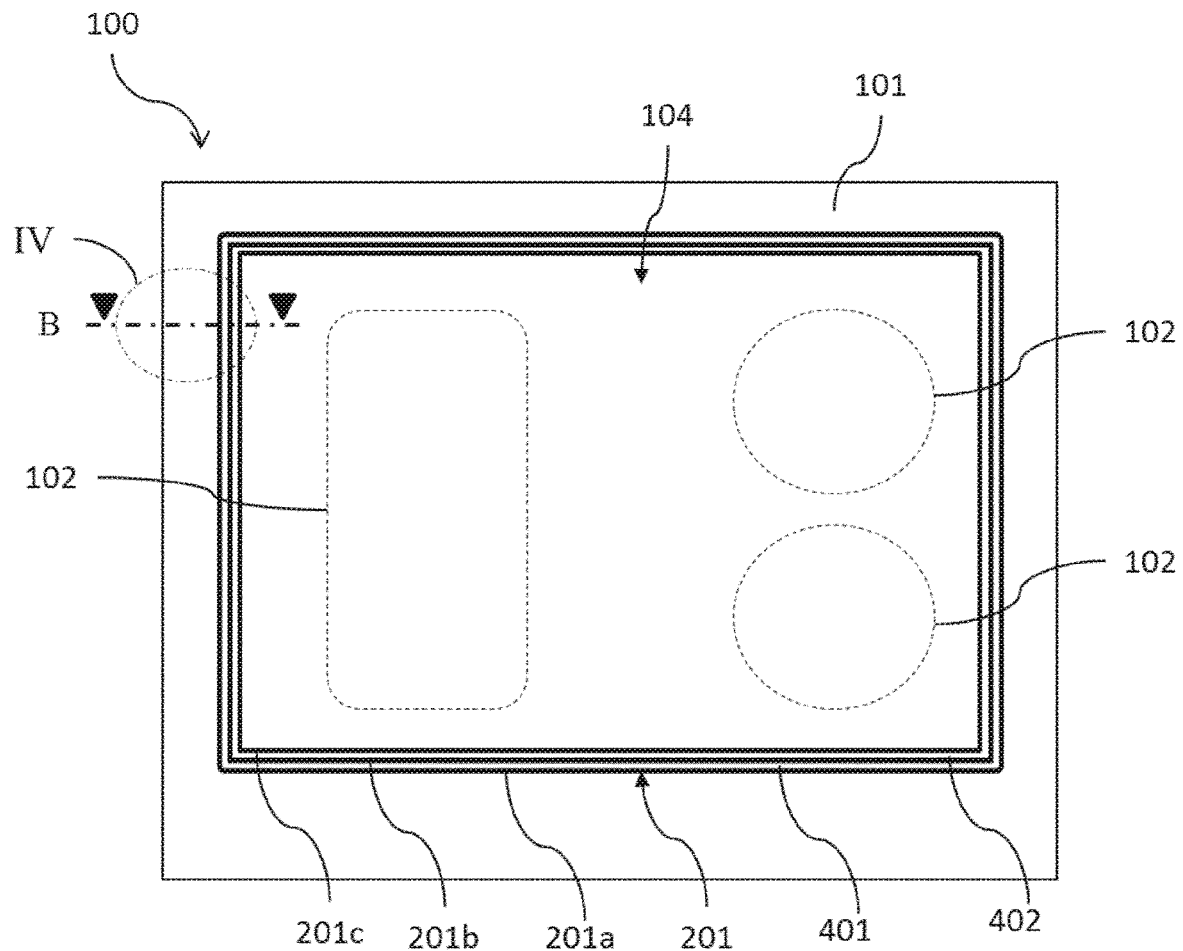
FIG. 2 is a schematic representation of a glass-ceramic plate according to a second embodiment of the invention.

FIG. 2 represents a glass-ceramic plate 100 according to a second embodiment of the invention. It comprises a main face 101 liable to be in contact with the liquids when it is in the process of being used. Zones 102 of the face of the glass-ceramic plate under which heating elements may be located when the glass-ceramic plate is used in a cooking device are also represented. The glass-ceramic plate comprises a single liquid-retaining bead 201 which surrounds a region 104 of the main face 101 of the plate liable to be in contact with the liquids. The retaining bead 201 is located in the vicinity of the periphery of the glass-ceramic plate and surrounds zones 102 of the face of the glass-ceramic plate under which heating elements may be located when the glass-ceramic plate is used in a cooking device. The liquid-retaining bead comprises three hydrophobic sub-beads 201a-201c separated by hydrophilic zones 401 and 402. The alternation of the hydrophobic sub-beads and of the hydrophilic zones is represented in FIG. 4 which corresponds to a cross section through the detail IV along the plane B.

Figure 3:
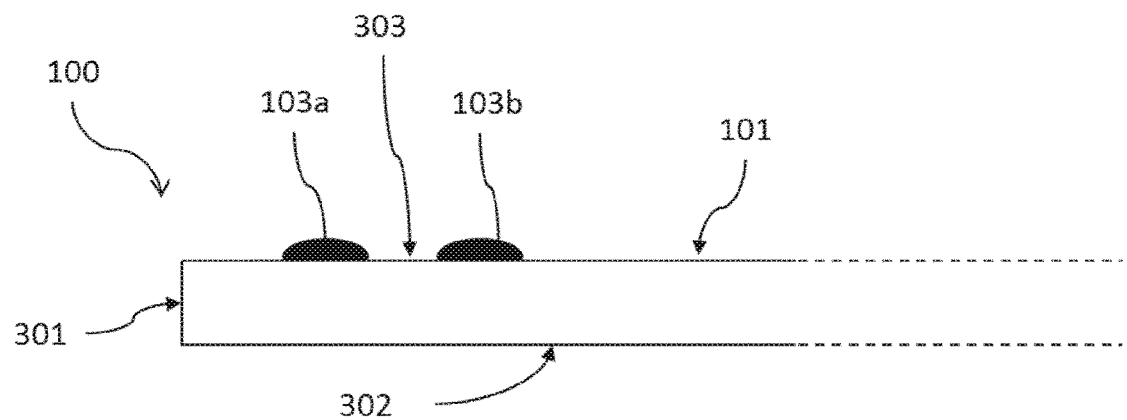
FIG. 3 is a schematic representation of a cross section along the plane A of the detail III from FIG. 1.

A cross section of the detail III along the plane A from FIG. 1 is represented in FIG. 3. The glass-ceramic plate 100 comprises a first main face 101, a second main face 302 and an edge 301. The main face 101 is liable to be in contact with liquids when the plate is in the process of being used. The retaining bead 103 is fastened to and in contact with the main face 101 liable to be in contact with liquids. It comprises two hydrophobic sub-beads 103a-103b separated by a hydrophilic zone 303. The two consecutive sub-beads may be irregularly or regularly spaced. The width of the hydrophobic zone is throughout between 500 µm and 2.5 cm, in particular between 500 µm and 1.2 cm, or even between 700 µm and 1.2 cm. The width of the hydrophobic sub-beads may advantageously be between 5 mm and 20 mm, in particular between 7 mm and 18 mm, or even between 10 mm and 15 mm.

Figure 4:
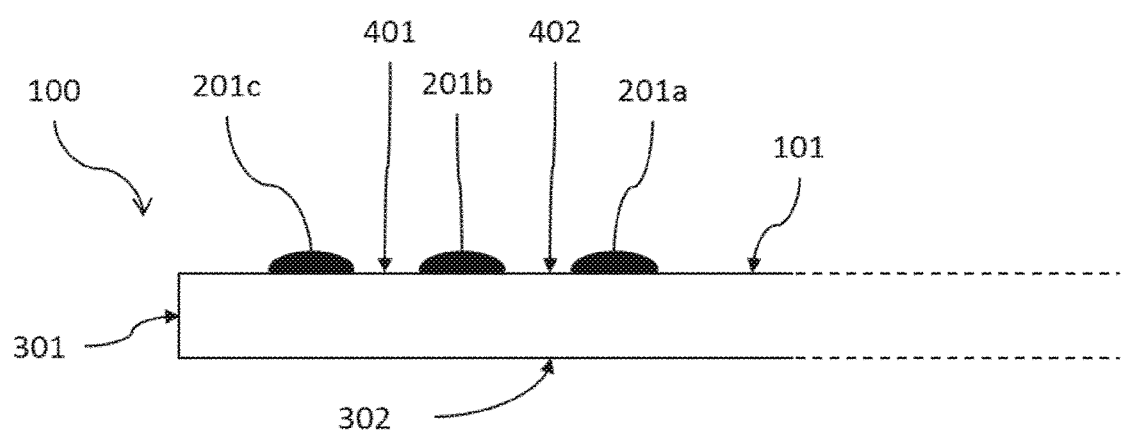
FIG. 4 is a schematic representation of a cross section along the plane B of the detail IV from FIG. 2.

FIG. 4 represents a cross section along the plane B of the detail IV from FIG. 2. The glass-ceramic plate 100 comprises a first main face 101, a second main face 302 and an edge 301. The main face 101 is liable to be in contact with liquids when the plate is in the process of being used. The retaining bead 201 is fastened to and in contact with the main face 101 liable to be in contact with liquids. It comprises three hydrophobic sub-beads 201a-201c separated alternately by two hydrophilic zones 401 and 402. The three consecutive sub-beads may be irregularly or regularly spaced. The width of the hydrophobic zones is throughout between 500 µm and 2.5 cm, in particular between 500 µm and 1.2 cm, or even between 700 µm and 1.2 cm. The width of the hydrophobic sub-beads may advantageously be between 5 mm and 20 mm, in particular between 7 mm and 18 mm, or even between 10 mm and 15 mm.

Figure 5:
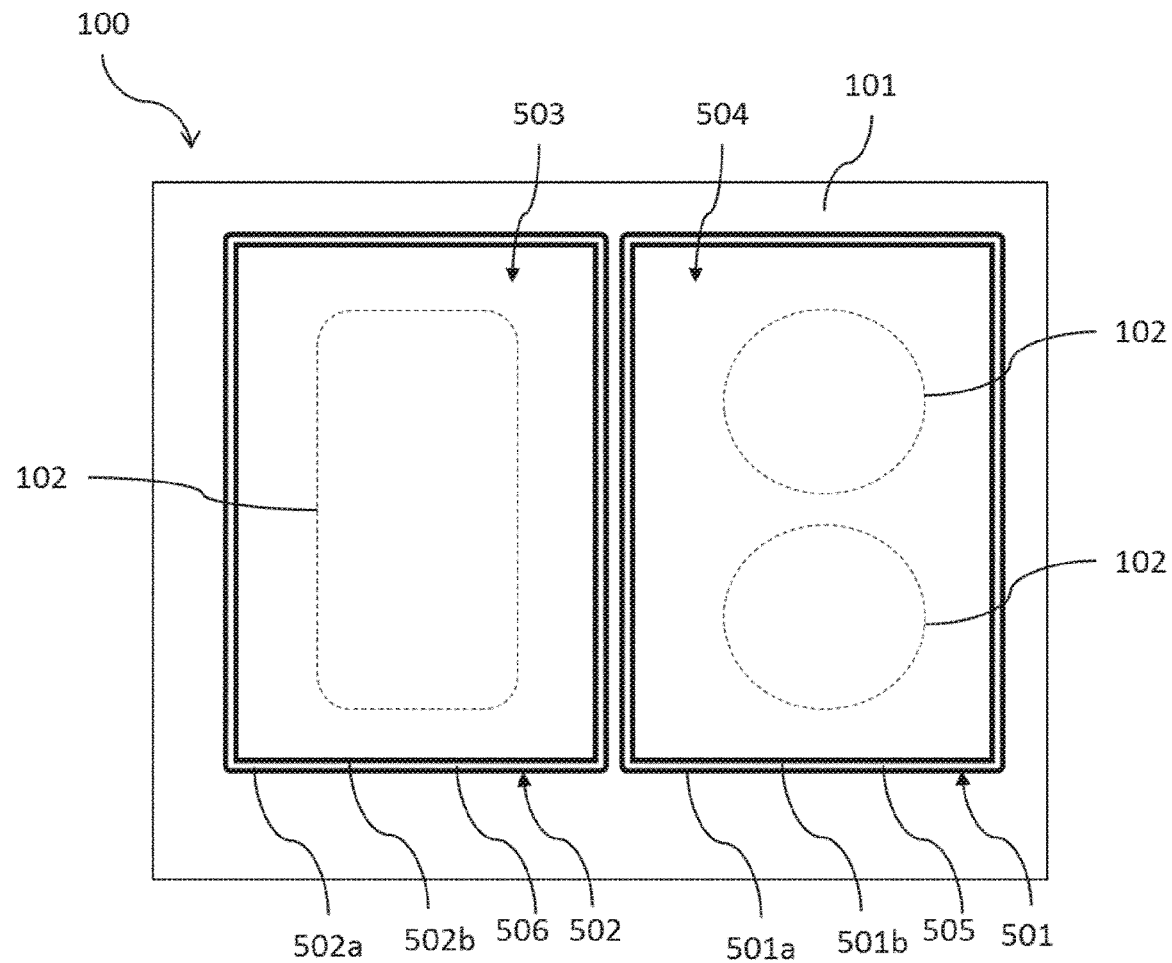
FIG. 5 is a schematic representation of a glass-ceramic plate according to a third embodiment of the invention.

FIG. 5 represents a glass-ceramic plate 100 according to a third embodiment. The glass-ceramic plate comprises a face 101 liable to be in contact with the liquids when the plate is in the process of being used. Zones 102 of the face of the glass-ceramic plate under which heating elements may be located when the glass-ceramic plate is used in a cooking device are also represented. The glass-ceramic plate comprises one two liquid-retaining beads 501 and 502 which surround two regions 503 and 504 of the face of the plate liable to be in contact with the liquids. The retaining beads surround zones 102 of the face of the glass-ceramic plate under which heating elements may be located when the glass-ceramic plate is used in a cooking device. Each liquid-retaining bead 501 and 502 comprises two hydrophobic sub-beads 501a-501b and 502a-502b respectively separated by hydrophilic zones 505 and 506.

Figure 6:
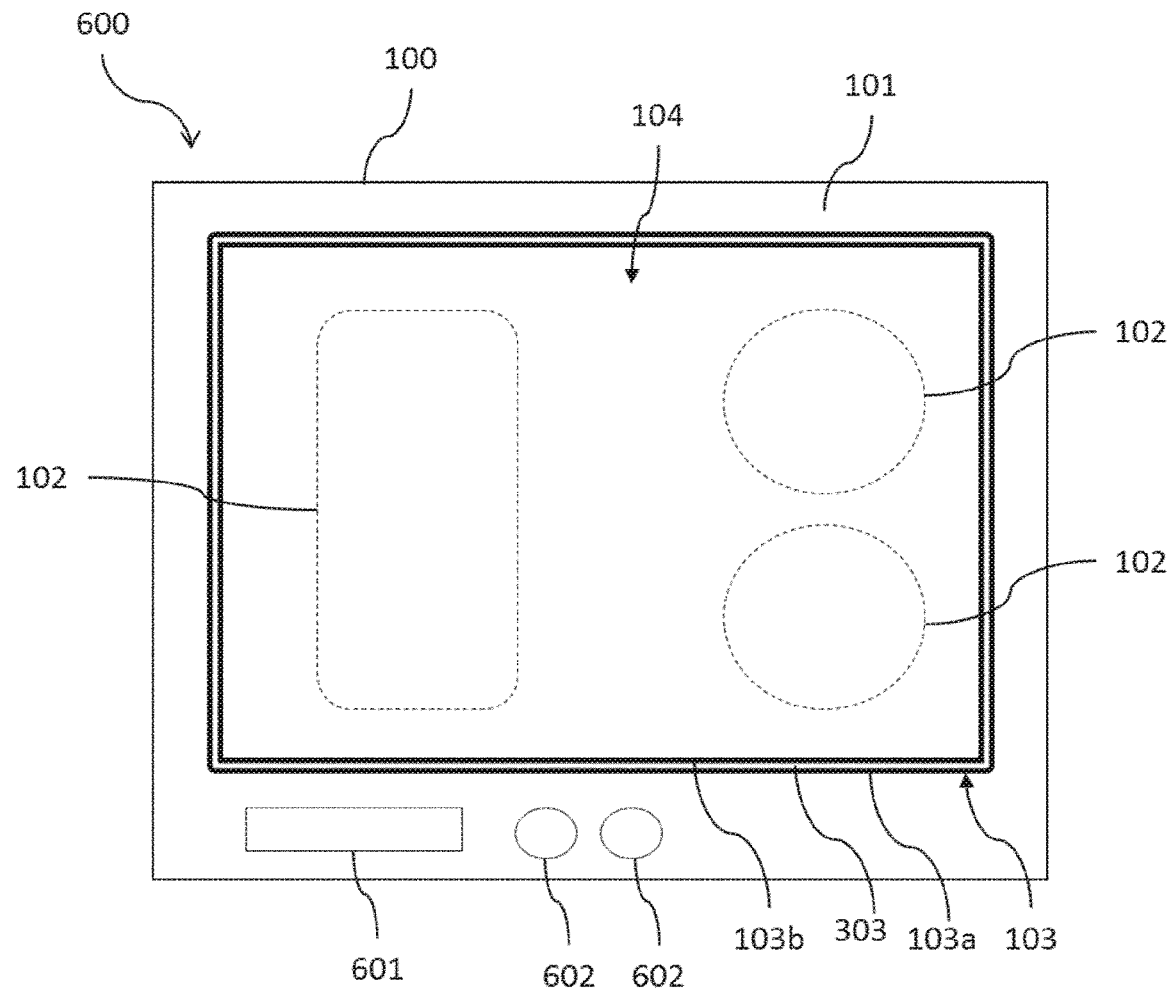
FIG. 6 is a schematic representation of a cooking device comprising a glass-ceramic plate according to a fourth embodiment of the invention.

A cooking device 600 comprising a glass-ceramic plate according to a variant of the first embodiment of the invention from FIG. 1 is represented in a top view in FIG. 6. The glass-ceramic plate 100 comprising a main face 101 liable to be in contact with the liquids when the plate is in the process of being used. For purely illustrative purposes, zones 102 of the face of the glass-ceramic plate under which heating elements may be located when the glass-ceramic plate is used in a cooking device are also represented. The glass-ceramic plate comprises a single liquid-retaining bead 103 which surrounds a region 104 of the main face 101 of the plate liable to be in contact with the liquids. The retaining bead 103 is located in the vicinity of the periphery of the glass-ceramic plate and surrounds zones 102 of the face of the glass-ceramic plate under which heating elements may be located. The liquid-retaining bead comprises two hydrophobic sub-beads 103a-103b separated by a hydrophilic zone 303. The cooking device comprises a display unit 601 and two control units 602. The display 601 and control 602 units are not within the region 104 defined by the retaining bead 103.

EXAMPLES

In order to illustrate the technical effect obtained by the invention, two examples of glass-ceramic plate according to the invention are compared to two examples of glass-ceramic plate provided with a retaining device or system according to the prior art.

The glass-ceramic plate used in the examples is a commercially available lithium aluminosilicate glass-ceramic plate.

In the examples according to the invention, a retaining bead comprising two hydrophobic sub-beads is fastened to and in contact with the face of two glass-ceramic plates according to the arrangement illustrated in FIG. 1. For each of the glass-ceramic plates, the width of each of the hydrophobic sub-beads and the width of the hydrophilic zone separating them are reported in table 1 (examples 1 and 2). The hydrophilic zone is formed by the surface of the glass-ceramic plate that has not undergone any treatment.

In order to produce the examples of glass-ceramic plate according to the prior art, a retaining bead comprising only a single hydrophobic sub-bead is fastened to and in contact with the face of two glass-ceramic plates according to the same arrangement illustrated in FIG. 1 (examples 3 and 4). Examples 3 and 4 are comparative examples. In order to avoid any experimental bias linked to the resizing of the retaining beads, the width of the sub-beads was adapted so that the surface area covered by the sub-beads and the surface area of the region surrounded by the retaining bead are identical to those of examples 1 and 2.

In the four examples, the surface area of the region (104) surrounded by the retaining bead is identical.

The hydrophobic sub-beads are based on fluorinated trichlorosilane. They were deposited by evaporation under reduced pressure (chemical vapor deposition). During the deposition, the regions of the glass-ceramic plate outside of the hydrophobic sub-beads were protected using a mask that is impermeable to the fluorinated compounds.

The retention performance of each glass-ceramic plate was evaluated by pouring water into the center of the regions surrounded by the retaining bead with an average flow rate of 2.4 to 2.5 ml/s. This flow rate is representative of the flow rate of a liquid overflowing from a cooking container.

The maximum volume retained and the maximum retention time before overflowing beyond the retaining beads were measured. The results are reported in table 1.

The comparison of examples 1 and 2 according to the invention and of comparative examples 3 and 4 according to the prior art shows that a glass-ceramic plate according to the invention enables a gain of 7% to 8% in the volume of liquid retained and the retention time before overflowing.

TABLE 1

|  | Example 1 | Example 2 | Example 3 (comparative) | Example 4 (comparative) |
| --- | --- | --- | --- | --- |
| Number of hydrophobic sub-beads | 2 | 2 | 1 | 1 |
| Width of the hydrophobic sub-beads (cm) | 1 | 1 | 1.81 | 1.57 |
| Width of the hydrophilic zones (cm) | 1 | 2 | — | — |
| Time before overflowing (s) | 47 | 46 | 43 | 44 |
| Maximum volume before overflowing (ml) | 112 | 113 | 105 | 105 |

Three examples of glass-ceramic plates according to the invention were produced with hydrophobic sub-beads comprising different hydrophobic compounds. Some of these compounds are commercially available.

In each example, the same type of glass-ceramic plate is used and the surface area of the region (104) surrounded by the retaining bead is identical. The glass-ceramic plate is of lithium aluminosilicate type. It representative of the glass-ceramic plates commercially available.

Table 2 indicates, for each example, the trade name of the hydrophobic compound used for the sub-beads, the type of compound, the values of contact angle θc, advancing angle θa, receding angle θc, and of hysteresis H.

The contact angles, advancing angle and receding angle were measured using a DSA100 goniometer sold by Krüss.

In example 5, the hydrophobic sub-beads are based on silicone (Diamon fusion ultra (DFI)). They were deposited in two goes by means of a spray or wiping (chemical liquid deposition).

In example 6, the hydrophobic sub-beads are based on silica and fluorosilane (SiF7E). They were deposited according to the protocol comprising the following steps:

depositing a solution of hydrolyzed TEOS at 0.3% by weight in isopropanol at pH 2 by spraying (chemical liquid deposition), drying for a time of 5 minutes, depositing a solution of SiF7E in isopropanol at pH 2 by spraying or wiping (chemical liquid deposition), drying for 15 minutes.

In example 7, the hydrophobic sub-beads are based on the product Nanofilm ABW.

The retention performance of each glass-ceramic plate was evaluated by pouring water into the center of the region surrounded by the retaining bead and by measuring the maximum height, h, of the film of retained liquid and the maximum retention time before overflowing beyond the bead.

Under static conditions, the water is deposited slowly, care being taken to minimize the movements of the liquid, and the height of the film of water formed is measured continually until there is overflowing beyond the retaining bead.

Under dynamic conditions, the water is poured with a flow rate representative of the flow rate of a liquid overflowing from a cooking container, and the height of the film of water formed and the time are measured continually until there is overflowing beyond the retaining bead. The measurements were carried out for three flow rate values: 1.8 ml/s (flow rate 1), 2.3 ml/s (flow rate 2) and 2.7 ml/s (flow rate 3).

The maximum values measured are given in table 2.

The examples show that a hysteresis value, H, of greater than or equal to 20° increases the values of the maximum height of the film retained and the retention time before overflowing under dynamic conditions compared to static conditions. The retention times are in particular 2 to 4 times higher, especially when the flow rate is high.

The comparison of examples 5 and 7 on the one hand, and of examples 7 and 8 on the other hand, shows that a high hysteresis value, in particular of greater than 30, allows longer retention times.

The comparison of examples 6 and 7 shows that, for similar advancing angle values, an increase in the hysteresis value allows longer retention times.

TABLE 2

|  |  |  | Example 5 | Example 6 | Example 7 |
|---|---|---|---|---|---|
|  |  |  | Trade name of the hydrophobic compound of the sub-beads | | |
|  |  |  | Diamon fusion ultra (DFI) | Nanofilm ABW (Ferro) | |
|  |  |  | Type of compound | | |
|  |  |  | silicone | silica and SiF7E | — |
| Static | | h (mm) | 3.4 | 4.4 | 4.1 |
| Dynamic | Flow rate 1 | h (mm) | 4.2 | 4.6 | 4.6 |
| | | Time (s) | 19.9 | 10.1 | 17.7 |
| | Flow rate 2 | h (mm) | 4.9 | 5.3 | 5 |
| | | Time (s) | 13.2 | 11.2 | 14.9 |
| | Flow rate 3 | h (mm) | 5 | 5.8 | 5.6 |
| | | Time (s) | 9.7 | 9.8 | 13.7 |
| Contact angles | | θ | 105 | 114 | 108 |
| | | θa | 108 | 120 | 117 |
| | | θr | 80 | 87 | 68 |
| Hysteresis | | H | 20 | 33 | 49 |

Four other comparative examples, examples 8, 9, 10 and 11 were also carried out in order to illustrate the technical effect of the invention. In these examples, a retaining bead comprising two hydrophobic sub-beads is fastened to and in contact with the face of two glass-ceramic plates according to the arrangement illustrated in FIG. 1. For each of the glass-ceramic plates, the width of each of the hydrophobic sub-beads and the width of the hydrophilic zone separating them are reported in table 1. In examples 8, 9, the width of the hydrophilic zone between two consecutive sub-beads is inside the range 500 μm-2.5 cm. In examples 10 and 11, the width of the hydrophilic zone is outside of this range. The hydrophilic zone is formed by the surface of the glass-ceramic plate that has not undergone any treatment. For comparison purposes, the surface area of the hydrophilic zone (303) surrounded by the two sub-beads is identical for all the examples 8, 9, 10 and 11.

The hydrophobic sub-beads are based on fluorinated trichlorosilane. They were deposited by evaporation under reduced pressure (chemical vapor deposition). During the deposition, the regions of the glass-ceramic plate outside of the hydrophobic sub-beads were protected using a mask that is impermeable to the fluorinated compounds.

The retention performance of each glass-ceramic plate was evaluated by pouring water into the center of the hydrophilic zones defined by the consecutive sub-beads of the retaining bead with an average flow rate of 2.4 to 2.5 ml/s. This flow rate is representative of the flow rate of a liquid overflowing from a cooking container.

The volume retained and the maximum retention time before overflowing beyond the hydrophilic zone were measured. The results are reported in table 3.

The comparison of the results of examples 8 and 9 according to the invention with that of example 10 shows that a glass-ceramic plate according to the invention enables a gain of 23% for example 8 and of 40% for example 9 in the volume of liquid retained before overflowing from the hydrophilic zone compared to a plate comprising a retaining bead comprising two consecutive sub-beads defining a hydrophilic zone width of 0.4 cm. Compared to the volume retained in example 9, the gain is 3% for comparative example 11 comprising a retaining bead with two consecutive sub-beads defining a hydrophilic zone width of greater than 2.5 cm. The gain in volume and in time are more particularly elevated when the width of the hydrophilic zone is between 500 μm and 2.5 cm, and more particularly between 0.5 cm and 2.5 cm.

TABLE 3

| | Example 8 | Example 9 | Example 10 | Example 11 (comparative) |
|---|---|---|---|---|
| Number of hydrophobic sub-beads | 2 | 2 | 2 | 2 |
| Width of the hydrophobic sub-beads (cm) | 1 | 1 | 1 | 1 |
| Width of the hydrophilic zones (cm) | 1 | 2 | 0.4 | 3 |
| Time before overflowing from the hydrophilic zone (s) | 27.1 | 30.5 | 21.7 | 31.6 |
| Volume before overflowing from the hydrophilic zone (ml) | 66.4 | 75.4 | 53.9 | 77.3 |

The invention claimed is:

1. A glass-ceramic plate for a cooking device comprising:
a first main face configured to be in contact with liquids when the plate is in the process of being used, a second main face and an edge,
a liquid-retaining bead fastened to and in contact with said first main face, wherein said retaining bead:
surrounds at least one region of said first main face so as to form a liquid-retaining reservoir, and
comprises at least two hydrophobic sub-beads inscribed within one another and separated by at least one hydrophilic zone, a width of the at least one hydrophilic zone between two consecutive sub-beads is at least greater than 500 µm and less than a threshold value, said threshold value being defined so that, when a liquid flows in the hydrophilic zone, a variation between (a) a retention time or volume of said liquid before said liquid overflows from the hydrophilic zone, and (b) a retention time or volume of a same liquid before said same liquid overflows from a hydrophilic zone having a width greater than said value, is less than 5%.

2. The glass-ceramic plate as claimed in claim 1, wherein the threshold value is at most 2.5 cm, the width of the at least one hydrophilic zone between two consecutive sub-beads being throughout between 500 µm and 2.5 cm.

3. The glass-ceramic plate as claimed in claim 1, wherein, when the hydrophobic sub-beads are in contact with water, the hysteresis H of the contact angle between said hydrophobic sub-beads and the water is greater than or equal to 20°, said hysteresis H of the contact angle being defined as the difference between the advancing angle θa and the receding angle θr the water on said hydrophobic sub-beads.

4. The glass-ceramic plate as claimed in claim 3, wherein said advancing angle is between 108 and 120°.

5. The glass-ceramic plate as claimed in claim 4, wherein said advancing angle is between 110 and 120°.

6. The glass-ceramic plate as claimed in claim 3, wherein, when the hydrophobic sub-beads are in contact with water, the hysteresis H of the contact angle between said hydrophobic sub-beads and the water is greater than or equal to 30°.

7. The glass-ceramic plate as claimed in claim 1, wherein the width of the hydrophobic sub-beads is between 5 mm and 20 mm.

8. The glass-ceramic plate as claimed in claim 7, wherein the width of the hydrophobic sub-beads is between 10 mm and 15 mm.

9. The glass-ceramic plate as claimed in claim 1, wherein a value of the roughness parameter, Ra, of the hydrophobic sub-beads is between 1 and 10 µm.

10. The glass-ceramic plate as claimed in claim 1, wherein a value of the peak-to-valley parameter, Rz, of the hydrophobic sub-beads is between 5 and 50 µm.

11. The glass-ceramic plate as claimed in claim 1, wherein a width of the retaining bead is between 2 cm and 6 cm.

12. The glass-ceramic plate as claimed in claim 1, wherein the retaining bead is placed at at most 3 cm from the edge of said glass-ceramic plate.

13. The glass-ceramic plate as claimed in claim 1, wherein a surface area of the region of the glass-ceramic plate surrounded by at least one retaining bead represents at least 60% of the surface area of the main face of the glass-ceramic plate.

14. The glass-ceramic plate as claimed in claim 1, wherein the hydrophobic sub-beads comprise one or more organic or inorganic compounds, the surface tension of which is at most 20 mN·m$^{-1}$.

15. The glass-ceramic plate as claimed in claim 1, wherein the hydrophobic sub-beads comprise one or more organic compounds chosen from polysiloxanes, organosiloxanes, fluorosiloxanes, fluorocarbons, fluoropolymers, fluorosilanes and a mixture thereof.

16. The glass-ceramic plate as claimed in claim 1, wherein the at least one hydrophilic zone is formed by the surface of the glass-ceramic plate that has not undergone any surface treatment.

17. The glass-ceramic plate as claimed in claim 1, wherein the at least one hydrophilic zone comprises one or more hydrophilic coatings deposited on one or more regions of the surface of the glass-ceramic plate.

18. The glass-ceramic plate as claimed in claim 1, wherein an entire region of the first main face of the glass-ceramic plate that separates the at least two hydrophobic sub-beads is formed solely by the at least one hydrophilic zone.

19. A cooking device comprising a glass-ceramic plate as claimed in claim 1.

20. The cooking device as claimed in claim 19, further comprising a control unit, wherein the control unit is not within the region(s) of the glass-ceramic plate defined by the retaining bead.

* * * * *